(12) United States Patent
Nose et al.

(10) Patent No.: US 9,909,234 B2
(45) Date of Patent: Mar. 6, 2018

(54) CELLULOSE FIBER, COMPOSITE MATERIAL, AND METHOD OF PRODUCING THE CELLULOSE FIBER

(71) Applicant: YAMAHA CORPORATION, Hamamatsu-shi (JP)

(72) Inventors: Takayuki Nose, Hamamatsu (JP); Tomoya Miyata, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/425,191

(22) Filed: Feb. 6, 2017

(65) Prior Publication Data

US 2017/0145595 A1   May 25, 2017

Related U.S. Application Data

(63) Continuation of application No. PCT/JP2015/064765, filed on May 22, 2015.

(30) Foreign Application Priority Data

Aug. 7, 2014   (JP) ................. 2014-161933

(51) Int. Cl.
| | | |
|---|---|---|
| C08L 1/00 | (2006.01) | |
| D01F 2/02 | (2006.01) | |
| C08K 7/02 | (2006.01) | |
| C08L 1/02 | (2006.01) | |
| D01D 5/12 | (2006.01) | |
| D01D 5/06 | (2006.01) | |

(52) U.S. Cl.
CPC .................. *D01F 2/02* (2013.01); *C08K 7/02* (2013.01); *C08L 1/02* (2013.01); *D01D 5/06* (2013.01); *D01D 5/12* (2013.01)

(58) Field of Classification Search
CPC .... D01F 2/02; C08K 7/02; C08L 1/02; D01D 5/12; D01D 5/06
USPC .......................................................... 524/35
See application file for complete search history.

(56) References Cited

U.S. PATENT DOCUMENTS 6,361,862 B1   3/2002   Kim et al.

FOREIGN PATENT DOCUMENTS

| | | |
|---|---|---|
| JP | S56-85413 A | 7/1981 |
| JP | H11-140772 A | 5/1999 |
| JP | 2003528993 A | 9/2003 |
| JP | 2007063745 A | 3/2007 |
| JP | 2011208327 A | 10/2011 |

OTHER PUBLICATIONS

International Search Report issued in International Application No. PCT/JP2015/064765 dated Aug. 11, 2015. English translation provided.
English translation of Written Opinion issued in International Application No. PCT/JP2015/064765 dated Aug. 11, 2015.

*Primary Examiner* — Hui Chin
(74) *Attorney, Agent, or Firm* — Rossi, Kimms & McDowell LLP

(57) ABSTRACT

A cellulose fiber can reduce environmental burden while providing an enhanced modulus of elasticity easily and reliably. A composite material contains the cellulose fiber. A method of producing the cellulose fiber includes preparing a solution where needle-shaped phases each comprising a cellulose I crystal structure are dispersed in a matrix phase comprising a cellulose II crystal structure. The cellulose fiber includes the matrix phase and the needle-shaped phases contained in the matrix phase and the needle-shaped phases are oriented along an axial direction.

5 Claims, 5 Drawing Sheets

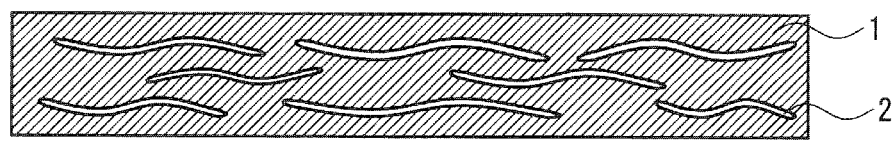
F I G. 1

US 9,909,234 B2

CELLULOSE FIBER, COMPOSITE MATERIAL, AND METHOD OF PRODUCING THE CELLULOSE FIBER

BACKGROUND

Conventional fibrous reinforcement materials can improve the strength, rigidity, etc., of a resin by their presence. Furthermore, glass fibers, for example, have been widely used for such fibrous reinforcement materials. Such glass fibers, however, have disadvantages in that, due to the high specific gravity of the glass fibers, they do not satisfy a demand for the reduction in weight, and furthermore, since the ash content of the glass fibers when incinerated is substantial, the burden on the environment is heavy.

On the other hand, a fibrous reinforcement material using a cellulose fiber as a carbon-neutral biomass raw material has been proposed. Since cellulose is a principal component of cell walls constituting a plant body, a fibrous reinforcement material formed using such cellulose can contribute to resource savings since such a fibrous reinforcement material can be produced with, for example, a waste material of wood as a raw material.

For such a fibrous reinforcement material using a cellulose fiber, a composite fiber containing a cellulose fiber and a single-walled carbon nanotube has been proposed in Japanese Patent Application Laid-Open Publication No. 2011-208327. According to this publication, the mechanical properties, such as tensile strength, of the composite fiber disclosed therein can be substantially improved due to the containment of single-walled carbon nanotubes.

Carbon nanotubes, however, are hydrophobic and the affinity with liquids is low. In other words, the carbon nanotubes have the disadvantage of low dispersibility. Therefore, the composite fiber disclosed in this publication is disadvantageous because it is difficult to uniformly disperse the single-walled carbon nanotubes in the cellulose fiber and it is also difficult to improve the tensile strength, etc., thereof easily and reliably.

Furthermore, generally, carbon nanotubes do not possess straightness. Therefore, according to the composite fiber, precise orientation of the single-walled carbon nanotubes in an axial direction of the cellulose fiber is difficult. In this regard, the composite fiber is disadvantageous in that the tensile strength, etc., of the composite fiber cannot be improved easily and reliably.

There remains a need for cellulose fiber that can reduce environmental burden while still enhancing modulus of elasticity easily and reliably. The present development addresses this need.

SUMMARY

One aspect of the present invention is a cellulose fiber that includes a matrix phase, and needle-shaped phases contained in the matrix phase, in which the matrix phase has a cellulose II crystal structure, the needle-shaped phases each have a cellulose I crystal structure, and the needle-shaped phases are oriented along an axial direction.

The average length of the needle-shaped phases is preferably no less than 2 μm and no greater than 4 μm, and the average diameter of the needle-shaped phases is preferably no less than 3 nm and no greater than 100 nm. In this way, when the average length and the average diameter of the needle-shaped phases thus each fall within the above range, the modulus of elasticity can be preferably further improved.

The content of the needle-shaped phase with respect to 100 parts by mass of the matrix phase in terms of solid content is preferably no less than 2 parts by mass and no greater than 25 parts by mass. In this way, when the content of the needle-shaped phase with respect to the matrix phase thus falls within the above range, the modulus of elasticity can be preferably further enhanced.

Another aspect of the present invention is a composite material that includes a base material and the cellulose fiber described above provided at least on one face of the base material, and a binder that secures the cellulose fiber to the base material.

Another aspect of the present invention is a method of producing the cellulose fiber described above. The method includes the steps of preparing a solution where the needle-shaped phases each having the cellulose I crystal structure are dispersed in the matrix phase having the cellulose II crystal structure, and extruding the solution through a spinning nozzle and coagulating the cellulose fiber.

BRIEF DESCRIPTION OF THE DRAWINGS

FIG. 1 is a schematic cross-sectional view of a cellulose fiber according to a first embodiment of the present invention at a face including an axis of the fiber.

DETAILED DESCRIPTION

Figure 2:
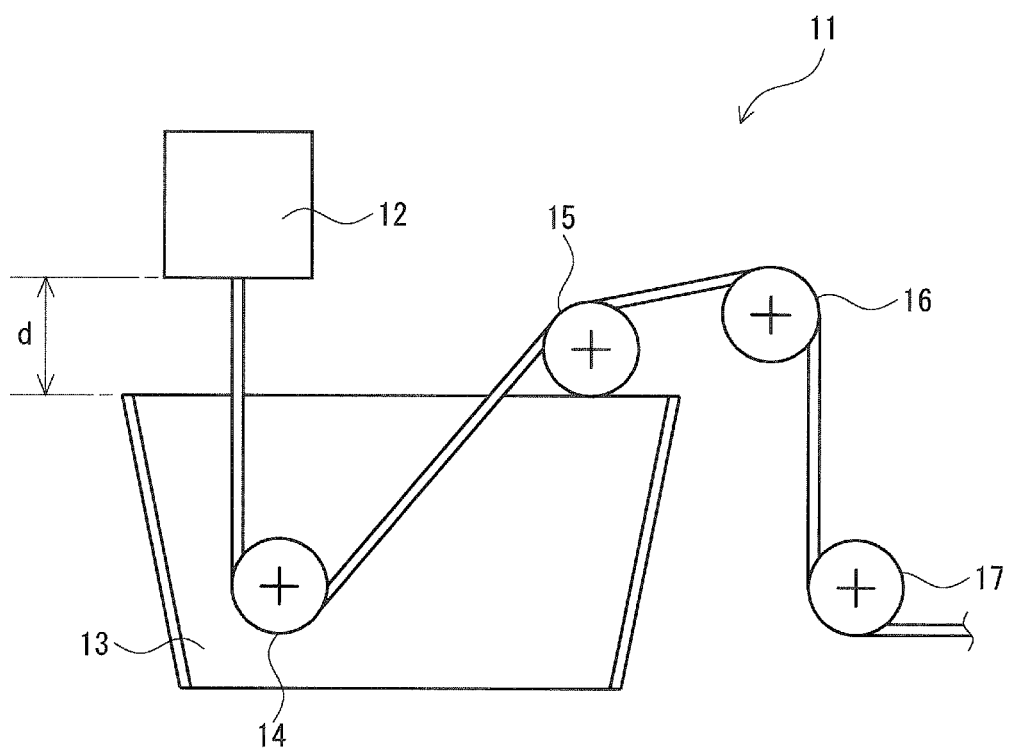
FIG. 2 is a schematic view illustrating an apparatus for producing the cellulose fiber of FIG. 1.

The present invention relates to a cellulose fiber, a composite material, and a method of producing the cellulose fiber.

First Embodiment (Cellulose Fiber)

A regenerated cellulose fiber (hereafter "cellulose fiber" for short) of FIG. 1 includes a matrix phase 1 and needle-shaped phases 2 contained in the matrix phase 1.

Examples of a cellulose raw material that can be used for the cellulose fiber include: celluloses separated from a plant fiber derived from plants such as wood, cotton, hemp, bamboo, kenaf, jute, banana, coconut, sea weed, and tea leaf; celluloses separated from animal fiber produced by ascidian; bacterial celluloses produced by acetic acid bacteria; and the like.

The lower limit of the average diameter of the cellulose fiber is preferably 35 μm, more preferably 38 μm, and still more preferably 40 μm. On the other hand, the upper limit of the average diameter of the cellulose fiber is preferably 70 μm, more preferably 67 μm, and still more preferably 65 μm. When the average diameter of the cellulose fiber is less than the lower limit, the needle-shaped phases 2 may not be contained in the matrix phase 1 sufficiently. But when the average diameter of the cellulose fiber is greater than the upper limit, the dispersibility of the cellulose may be deteriorated.

Matrix Phase

The matrix phase 1 has a cellulose II crystal structure. The cellulose II crystal structure is obtained by being regenerated after the molecularly dispersed dissolution state, and has an antiparallel chain structure where the directions of adjacent molecular chains in the crystal toward the non-reducing end thereof are substantially reversed from each other.

Needle-Shaped Phase

The needle-shaped phase 2 has a cellulose I crystal structure. The cellulose I crystal structure is specific to natural cellulose and has a parallel chain structure where all of the directions of adjacent molecular chains in the crystal toward the reducing end thereof are identical to each other.

The lower limit of the average length of the needle-shaped phases 2 is preferably 2 μm, more preferably 2.3 μm, and still more preferably 2.5 μm. On the other hand, the upper limit of the average length of the needle-shaped phases 2 is preferably 4 μm, more preferably 3.7 μm, and still more preferably 3.5 μm. When the average length of the needle-shaped phases 2 is less than the lower limit, the modulus of elasticity of the cellulose fiber may not be improved sufficiently. But when the average length of the needle-shaped phases 2 is greater than the upper limit, the needle-shaped phases 2 contained in the matrix phase 1 are highly likely to be entangled.

The lower limit of the average diameter of the needle-shaped phases 2 is preferably 3 nm, preferably 3.5 nm, and still more preferably 4 nm. On the other hand, the upper limit of the average diameter of the needle-shaped phases 2 is preferably 100 nm, more preferably 50 nm, and still more preferably 30 nm. When the average diameter of the needle-shaped phases 2 is less than the lower limit, the production of the needle-shaped phase 2 may be substantially difficult. But when the average diameter of the needle-shaped phases 2 is greater than the upper limit, the aspect ratio of the needle-shaped phase 2 is smaller, and consequently, the modulus of elasticity of the cellulose fiber may not be improved sufficiently.

It should be noted that, when the average length and the average diameter of the needle-shaped phases 2 thus each fall within the range described above, the modulus of elasticity of the cellulose fiber can be improved effectively.

The lower limit of the aspect ratio of the needle-shaped phases 2 is preferably 20, more preferably 100, and still more preferably 200. On the other hand, the upper limit of the aspect ratio of the needle-shaped phases 2 is preferably 1300, more preferably 1000, and still more preferably 800. When the aspect ratio of the needle-shaped phases 2 is less than the lower limit, the modulus of elasticity of the cellulose fiber may not be improved sufficiently. But when the aspect ratio of the needle-shaped phases 2 is greater than the upper limit, the needle-shaped phases 2 contained in the matrix phase 1 are highly likely to be entangled.

The lower limit of the content of the needle-shaped phase 2 with respect to 100 parts by mass of the matrix phase 1 in terms of solid content is preferably 2 parts by mass, more preferably 3 parts by mass, and still more preferably 4 parts by mass. On the other hand, the upper limit of the content of the needle-shaped phase 2 with respect to 100 parts by mass of the matrix phase 1 in terms of solid content is preferably 25 parts by mass, more preferably 15 parts by mass, and still more preferably 10 parts by mass. When the content of the needle-shaped phase 2 with respect to the matrix phase 1 is less than the lower limit, the content ratio of the needle-shaped phase 2 is smaller. Therefore, the modulus of elasticity of the cellulose fiber may not be improved preferably. But when the content of the needle-shaped phase 2 with respect to the matrix phase 1 is greater than the upper limit, the content ratio of the needle-shaped phase 2 is greater. Therefore, the adhesive property between the matrix phase 1 and the needle-shaped phase 2 may be deteriorated and the modulus of elasticity of the cellulose fiber may be reduced. Furthermore, when the content of the needle-shaped phase 2 with respect to the matrix phase 1 is greater than the upper limit, the transparency of the cellulose fiber may be deteriorated. In this regard, when the content of the needle-shaped phase 2 with respect to the matrix phase 1 falls within the above range, the modulus of elasticity and the transparency of the cellulose fiber can be improved.

The needle-shaped phases 2 are oriented along an axial direction of the cellulose fiber. The lower limit of the absolute value of the average orientation angle of the needle-shaped phases 2 with respect to the axial direction of the cellulose fiber is preferably 0°. On the other hand, the upper limit of the absolute value of the average orientation angle of the needle-shaped phases 2 with respect to the axial direction of the cellulose fiber is preferably 15°, more preferably 10°, and still more preferably 5°. When the absolute value of the average orientation angle of the needle-shaped phases 2 with respect to the axial direction of the cellulose fiber is greater than the upper limit, the modulus of elasticity of the cellulose fiber may not be improved sufficiently. It should be noted that "the absolute value of the average orientation angle of a needle-shaped phases with respect to the axial direction of the cellulose fiber" refers to an average value calculated based on measurement for orientation angles of center axes of forty needle-shaped phases with respect to the central axis of the cellulose fiber when observing the forty needle-shaped phases from one side using a scanning electron microscope (SEM).

Method of Producing Cellulose Fiber

Next, a method for producing the cellulose fiber will be described. The method of producing the cellulose fiber includes the step of preparing a solution where the needle-shaped phases each having the cellulose I crystal structure are dispersed in the matrix phase having the cellulose II crystal structure (preparation step) and the step of extruding the solution through a spinning nozzle 12 (see FIG. 2) and coagulating the cellulose fiber (spinning step).

Preparation Step

The preparation step is performed by charging a cellulose raw material as a starting material of the cellulose fiber into a solution including an ionic liquid and an aprotic organic solvent and then mixing them.

Examples of the cellulose raw material that can be used in the preparation step include: celluloses separated from a plant fiber derived from plants such as wood, cotton, hemp, bamboo, kenaf, jute, banana, coconut, sea weed, and tea leaf; celluloses separated from animal fiber produced by ascidian; bacterial celluloses produced by acetic acid bacteria; and the like. It should be noted that a cellulose raw material from which impurities, such as lignin, are removed beforehand is preferably used.

The ionic liquid is exemplified by a compound containing a cation and an anion. For the ionic liquid, a salt or a salt mixture that maintains its liquid state at room temperature and melts below the room temperature principally is used. Examples of the cation include organic cations, e.g., cyclic amidine ions, such as imidazolium ions, pyridinium ions, ammonium ions, sulfonium ions, and phosphonium ions, and the like, and one kind thereof or a mixture of two or more kinds thereof can be used. In addition, examples of the anion include halogen, $NO_2^-$, $NO_3^-$, $SO_4^-$, $SbF_6^-$, $AsF_6^-$, $AlCl_4^-$, $Al_2Cl_7^-$, $BF_4^-$, $PF_4^-$, $PF_6^-$, $CH_3COO^-$, $CF_3SO_3^-$, $(CF_3SO_2)_2N^-$, $(CF_3SO_2)_3C^-$, and the like, and one kind thereof or a mixture of two or more kinds thereof can be used. Among them, the ionic liquid is preferably an imidazolium salt, such as 1-butyl-3-methylimidazolium chloride, 1-butyl-3-methylimidazolium bromide, 1-allyl-3-methylimidazolium chloride, 1-allyl-3-methylimidazolium bromide, 1-propyl-3-methylimidazolium bromide, 1-ethyl-3-methylimidazolium acetate, 1-ethyl-3-methylimidazolium formate, and particularly preferably 1-butyl-3-methylimidazolium chloride.

In addition, the aprotic organic solvent is not particularly limited so long as it lowers the viscosity of the ionic liquid and enhances the liquidity of the solution. Some examples thereof include N,N-dimethylacetamide, N,N-dimethylformamide, 1-methyl-2-pyrrolidone, pyridine, acetonitrile, dimethyl sulfoxide, and the like, and one kind thereof or a mixture of two or more kinds thereof can be used. Among them, N,N-dimethylformamide is preferred since it can preferably lower the viscosity of the ionic liquid.

The preparation step is carried out by, for example, (1) a procedure that involves separately providing a solution of the matrix phase having the cellulose II crystal structure and a solution of the needle-shaped phases each having the cellulose I crystal structure and then mixing them, or (2) a procedure that involves preparing a solution where the matrix phase having the cellulose II crystal structure and the needle-shaped phases each having the cellulose I crystal structure are dispersed, in a single line.

The procedure (1) is exemplified by a procedure that involves the step of dissolving a cellulose raw material in a solution containing the ionic liquid and the aprotic organic solvent to produce a solution that principally contains the matrix phase having the cellulose II crystal structure (first solution production step), the step of dissolving the cellulose raw material in the solution containing the ionic liquid and the aprotic organic solvent under a condition different from that in the first solution production step to produce a solution that principally contains the needle-shaped phases each having the cellulose I crystal structure (second solution production step), and the step of mixing the solutions obtained in the first solution production step and the second solution production step (mixing step).

The lower limit of a mixing ratio of the ionic liquid to the aprotic organic solvent in the first solution production step is preferably 1/4, more preferably 3/10, and still more preferably 8/25. On the other hand, the upper limit of the mixing ratio of the ionic liquid to the aprotic organic solvent in the first solution production step is preferably 2/5, more preferably 19/50, and still more preferably 7/20. When the mixing ratio of the ionic liquid to the aprotic organic solvent in the first solution production step is less than the lower limit, the content of the ionic liquid in the solution may be reduced and the matrix phase having the cellulose II crystal structure may not be obtained precisely. But when the mixing ratio of the ionic liquid to the aprotic organic solvent in the first solution production step is greater than the upper limit, the needle-shaped phase having the cellulose I crystal structure may be generated easily.

The lower limit of the dissolution temperature in the first solution production step is preferably 70° C., more preferably 75° C., and still more preferably 78° C. On the other hand, the upper limit of the dissolution temperature in the first solution production step is preferably 100° C., more preferably 90° C., and still more preferably 85° C. When the dissolution temperature in the first solution production step is less than the lower limit, the matrix phase having the cellulose II crystal structure may not be generated precisely. But when the dissolution temperature in the first solution production step is greater than the upper limit, the ionic liquid or the cellulose may become degraded.

The lower limit of the dissolution time period in the first solution production step is preferably 6 hours, more preferably 7 hours, and still more preferably 7.5 hours. On the other hand, the upper limit of the dissolution time period in the first solution production step is preferably 10 hours, more preferably 9 hours, and still more preferably 8.5 hours. When the dissolution time period in the first solution production step is less than the lower limit, the matrix phase having the cellulose II crystal structure may not be generated sufficiently. But when the dissolution time period in the first solution production step is greater than the upper limit, the productivity may be reduced.

The lower limit of the mixing ratio of the ionic liquid to the aprotic organic solvent in the second solution production step is preferably 21/50, more preferably 9/20, and still more preferably 12/25. On the other hand, the upper limit of the mixing ratio of the ionic liquid to the aprotic organic solvent in the second solution production step is preferably 3/5, more preferably 11/20, and still more preferably 26/50. When the mixing ratio of the ionic liquid to the aprotic organic solvent in the second solution production step is less than the lower limit, the content of the ionic liquid in the solution may be reduced and the needle-shaped phase having the cellulose I crystal structure may not be obtained precisely. But when the mixing ratio of the ionic liquid to the aprotic organic solvent in the second solution production step is greater than the upper limit, the viscosity of the solution may be high, and thus the ionic liquid may hardly permeate into the cellulose raw material and the dissolution of the cellulose raw material may progress slowly.

The lower limit of the dissolution temperature in the second solution production step is preferably 50° C., more preferably 55° C., and still more preferably 57° C. On the other hand, the upper limit of the dissolution temperature in the second solution production step is preferably 65° C., more preferably 62° C., and still more preferably 60° C. When the dissolution temperature in the second solution production step is less than the lower limit, the needle-shaped phase having the cellulose I crystal structure may not be generated precisely. But when the dissolution temperature in the second solution production step is greater than the upper limit, the generation of the matrix phase having the cellulose II crystal structure is promoted and the needle-shaped phase having the cellulose I crystal structure may not be generated precisely.

The lower limit of the dissolution time period in the second solution production step is preferably 6 hours, more preferably 7 hours, and still more preferably 7.5 hours. On the other hand, the upper limit of the dissolution time period in the second solution production step is preferably 10 hours, more preferably 9 hours, and still more preferably 8.5 hours. When the dissolution time period in the second solution production step is less than the lower limit, the matrix phase having the cellulose II crystal structure may not be generated sufficiently. But when the dissolution time period in the second solution production step is greater than the upper limit, the productivity may be reduced.

The lower limit of the content of the needle-shaped phase with respect to 100 parts by mass of a matrix phase in the mixing step is preferably 2 parts by mass, more preferably 3 parts by mass, and still more preferably 4 parts by mass.

On the other hand, the upper limit of the content of the needle-shaped phase with respect to 100 parts by mass of the matrix phase in the mixing step is preferably 25 parts by mass, more preferably 15 parts by mass, and still more preferably 10 parts by mass. When the content of the needle-shaped phase in the mixing step is less than the lower limit, the content ratio of the needle-shaped phase in the cellulose fiber may be smaller. Therefore, the modulus of elasticity of the cellulose fiber may not be improved preferably. But when the content of the needle-shaped phase in the mixing step is greater than the upper limit, the content ratio of the needle-shaped phase in the cellulose fiber may be greater. Therefore, the adhesive property between the matrix phase and the needle-shaped phase may be deteriorated.

In addition, it is preferred that the ionic liquid used in the first solution production step is identical to the ionic liquid used in the second solution production step, and the aprotic organic solvent used in the first solution production step is identical to the aprotic organic solvent used in the second solution production step. Thus, when the same ionic liquids are used both in the first solution production step and the second solution production step and the same aprotic organic solvents are used both in the first solution production step and the second solution production step, the solubility in a coagulation bath (described later) can be improved.

The aforementioned procedure (2) is exemplified by a procedure that involves dissolving the cellulose raw material in a solution containing the ionic liquid and the aprotic organic solvent to produce the matrix phase having the cellulose II crystal structure and then successively producing the needle-shaped phase having the cellulose I crystal structure. More specifically, the cellulose raw material is first dissolved in the solution containing the ionic liquid and the aprotic organic solvent and are mixed at the same ratio as that in the first solution production step, and then this cellulose raw material is dissolved at the same dissolution temperature for the same dissolution time period as those in the first solution production step to obtain the matrix phase having the cellulose II crystal structure. Then, the cellulose raw material is dissolved in the same solution at the same dissolution temperature for the same dissolution time period as those in the second solution production step to obtain the needle-shaped phase having the cellulose I crystal structure. With these operations, the solution where the matrix phase having the cellulose II crystal structure and the needle-shaped phases each having the cellulose I crystal structure are dispersed can be prepared. Furthermore, in the abovementioned procedure (2), it is preferred that the content of the needle-shaped phase having the cellulose I crystal structure with respect to 100 parts by mass of the matrix phase having the cellulose II crystal structure in this solution is adjusted at the same ratio as that in the mixing step. Moreover, in the abovementioned procedure (2), it is also preferred that the mixing ratio of the ionic liquid and the aprotic organic solvent is adjusted at the same ratio as that in the second solution production step when the needle-shaped phase having the cellulose I crystal structure is produced.

It should be noted that, when the cellulose raw material is dissolved in the preparation step, the cellulose raw material, the ionic liquid, and the aprotic organic solvent can be introduced at one time, or each ingredient also can be added in a step-wise manner so as to adjust the concentration, etc., of the solution.

In the method of producing the cellulose fiber, in a case where the procedure (2) is employed, when the matrix phase having the cellulose II crystal structure is produced and the temperature of the solution at the dissolution temperature, which is the same as that in the second solution production step is maintained, the generation of the matrix phase having the cellulose II crystal structure can be prevented and the generation of the needle-shaped phase having the cellulose I crystal structure can be promoted. Therefore, in the method of producing the cellulose fiber, the solution where needle-shaped phases each having a cellulose I crystal structure are dispersed in the matrix phase having the cellulose II crystal structure can be preferably prepared not only by the procedure (1) that involves providing the solution of the matrix phase having the cellulose II crystal structure and the solution of the needle-shaped phases each having the cellulose I crystal structure separately and then mixing them, but also by the procedure (2) that involves preparing the solution in which the matrix phase having the cellulose II crystal structure and the needle-shaped phases each having the cellulose I crystal structure are dispersed, in a single line. Among them, according to the method of producing the cellulose fiber, the procedure (1) is preferably used due to preferable inhibition of the increase in the viscosity of the solution.

Spinning Step

The spinning step is performed, for example, using a spinning apparatus 11 in FIG. 2. The spinning apparatus 11 includes a spinning nozzle 12, a coagulation bath 13, and a plurality of guide rolls 14, 15, 16 and 17. The coagulation bath 13 is filled with a polar liquid, such as ethanol and water. Furthermore, in the spinning apparatus 11, an air gap d is formed from a tip (lower end) of the spinning nozzle 12 to the liquid in the coagulation bath 13.

The spinning step is performed, for example, by extruding the solution prepared in the preparation step into the coagulation bath 13 from the spinning nozzle 12 through the air gap d and coagulating the cellulose fiber in this coagulation bath 13, and then drawing the cellulose fiber through the plurality of guide rolls 14, 15, 16, and 17.

Furthermore, the spinning step may include the step of extruding the solution prepared in the preparation step into the coagulation bath 13 and coagulating the cellulose fiber, and then stretching the cellulose fiber. The stretching step includes, for example, increasing the speed of winding of the fiber obtained by being coagulated in the coagulation bath 13 more than the speed of discharging of the spinning nozzle 12.

The lower limit of the stretching ratio in the spinning step is preferably 2, more preferably 6.5, and still more preferably 9.8. By setting the stretching ratio in the spinning step to be no less than the lower limit, the needle-shaped phases are oriented more precisely along the axial direction, and the modulus of elasticity of the cellulose fiber can be further improved. It should be noted that the upper limit of the stretching ratio in the spinning step is not particularly limited and may be 30, for example.

Quality of Cellulose Fiber

The lower limit of the tensile modulus of elasticity of the cellulose fiber is preferably 20 GPa, more preferably 25 GPa, still more preferably 30 GPa, and particularly preferably 40 GPa. When the tensile modulus of elasticity of the cellulose fiber is less than the lower limit, a sufficient reinforcement effect may not be achieved in the use as a reinforcement material such as a plate. Furthermore, the upper limit of the tensile modulus of elasticity of the cellulose fiber is not particularly limited and may be 200 GPa, for example. It should also be noted that "tensile modulus of elasticity" refers to a value determined according to JIS-R-7606 (2000).

Advantages

Since the cellulose fiber includes the matrix phase 1 and the needle-shaped phases 2 contained in the matrix phase 1, and both the matrix phase 1 and each needle-shaped phase 2 are formed of cellulose, the affinity between them is high. Therefore, according to the cellulose fiber, the uniform dispersibility of the needle-shaped phases 2 in the matrix phase 1 is improved. Furthermore, according to the cellulose fiber, since the needle-shaped phase 2 has the cellulose I crystal structure, the straightness of the needle-shaped phase 2 is high. For this reason, the modulus of elasticity of the cellulose fiber can be enhanced easily and reliably by the needle-shaped phases 2 that are substantially dispersed uniformly in the matrix phase 1 being oriented along the axial direction. Moreover, according to the cellulose fiber, since both the matrix phase 1 and the needle-shaped phase 2 are formed of cellulose, environmental burden can be reduced.

Since the method of producing the cellulose fiber includes the step of preparing the solution where the matrix phase having the cellulose II crystal structure and the needle-shaped phases each having the cellulose I crystal structure are dispersed, and the step of extruding this solution through the spinning nozzle and coagulating the cellulose fiber, precise orientation of the needle-shaped phases is possible easily and precisely along the axial direction in the produced cellulose fiber. In other words, since the method of producing the cellulose fiber produces the cellulose fiber by extruding the solution prepared in the preparation step through the spinning nozzle and coagulating the cellulose fiber, the needle-shaped phases can be readily oriented along the axial direction by the stretching of the fiber along the axial direction during the spinning. Therefore, the method of producing the cellulose fiber exerts not only effects that the affinity of the matrix phase and the needle-shaped phases is high, the needle-shaped phases are readily dispersed uniformly in the matrix phase, and the straightness of the needle-shaped phase is high, but also an effect that the modulus of elasticity of the cellulose fiber can be enhanced preferably. Moreover, according to the method of producing the cellulose fiber, since both the matrix phase and the needle-shaped phase are formed of cellulose, environmental burden can be reduced. In addition, according to the method of producing the cellulose fiber, since recovery and recycling of the ionic liquid used in the preparation step is easy, the method achieves a superior resource saving.

Second Embodiment (Composite Material)

Figure 3:
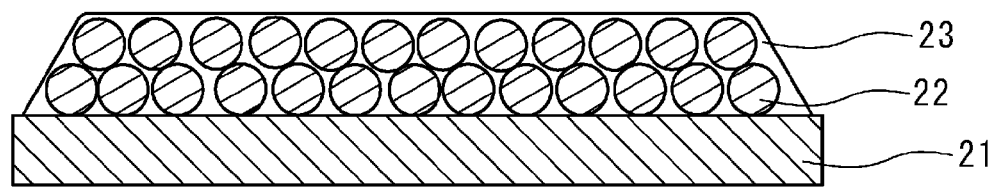
FIG. 3 is a schematic cross-sectional view of a composite material that includes a base material and the cellulose fiber of FIG. 1, and a binder that secures the cellulose fiber to the base material.

Referring to FIG. 3, a composite material according to the second embodiment of the present invention includes a base material 21, a plurality of cellulose fibers 22 according to the first embodiment provided at at least on one face/side of this base material, and a binder 23 that secures the cellulose fiber to the base material. The shape of the composite material is not particularly limited and examples thereof include a plate shape, a column shape, a cone shape, and the like.

In a case where the composite material has a plate shape, the cellulose fiber is provided, for example, on a front side or a back side that are vertical to the thickness direction of the composite material. The front face and the back face are disposed in parallel with each other to form the largest area on the base material in the plate shape. In a case where the composite material has a plate shape, to enhance the strength of the composite material, it is preferred to provide the cellulose fiber on the front face or the back face having the largest area and is easily bent. The cellulose fiber can be provided on both the front face and the back face or on either the front face or the back face. Since the cellulose fiber can have a woody color, it is preferred to provide the cellulose fiber at a side that can be viewed by viewers when desired to utilize the effect as a design material.

On the other hand, in a case where the composite material has a curved surface, the cellulose fiber is provided, for example, in a direction substantially parallel with a curved axis direction. Furthermore, in a case where the composite material is a sound reflecting board, the cellulose fiber is provided at a portion of the face that would change a specific frequency of vibration, for example. More specifically, the cellulose fiber can be provided at any location on an easily bent face of the base material. With such a configuration, a specific vibration mode can be emphasized or inhibited. In this way, the cellulose fiber is not necessarily provided on the entire face of the composite material, and thus may be provided only at a portion of the face according to the shape, use, etc., as described above.

The binder is exemplified by a synthetic resin, such as a thermoplastic resin and an ultraviolet curable resin, and a thermosetting adhesive, such as an epoxy resin.

Examples of the thermoplastic resin include ethylene vinyl acetate copolymers, polyolefins, polyamide, synthetic rubber, and the like.

Examples of the ultraviolet curable resin include ultraviolet curable urethane acrylates, ultraviolet curable polyester acrylates, ultraviolet curable epoxy acrylates, ultraviolet curable polyol acrylates, ultraviolet curable epoxy resins, and the like.

The composite material can be formed, for example, by applying the cellulose fiber and the binder on the surface of the base material and drying them.

Advantages

The strength of the composite material can be improved since the cellulose fiber is provided on the surface of this composite material. Furthermore, the cellulose fiber can adjust a specific frequency of vibration of a sound reflecting board precisely since it is provided on the surface of the sound reflecting board, for example.

Since the cellulose fiber having a superior modulus of elasticity is provided on the surface, the composite material can improve the strength thereof easily and reliably. Furthermore, in a case where the composite material is a sound reflecting board, it is possible not only to improve the strength thereof but also to adjust a specific frequency of vibration precisely.

Third Embodiment (Synthetic Resin Plate)

A synthetic resin plate according to the third embodiment of the present invention includes a sheet main body made of synthetic resin and a plurality of the cellulose fibers according to the first embodiment of the present invention contained in this sheet main body.

The synthetic resin is exemplified by a thermoplastic resin. Furthermore, examples of the thermoplastic resin include polyethylene, polypropylene, polystyrene, polyvinyl chloride, polyethylene terephthalate, polyvinyl acetate, ABS resins, polyacryl, fluorocarbon resins, polyamide, polyurethane, polyacetal, polycarbonate, and the like.

A method of producing the synthetic resin plate includes, for example, the step of preparing a synthetic resin plate forming material containing the synthetic resin and the cellulose fiber and the step of forming the synthetic resin plate by a solvent casting procedure, the melt extrusion procedure, etc., using the synthetic resin plate forming material.

Advantages

Since the synthetic resin plate contains the cellulose fiber, it possesses superior strength.

EXAMPLES

The present invention will be further described in detail by way of Examples below, but the present invention is not limited to the following Examples.

Example 1

A mixed solution including a matrix phase having a cellulose II crystal structure and needle-shaped phases each having a cellulose I crystal structure was spun using the spinning apparatus 11 of FIG. 2 to produce a cellulose fiber of Example 1. It should be noted that the stretching ratio was set to be 1 (i.e., unstretched) when spinning using the spinning apparatus 11. In addition, the content of the needle-shaped phase in the cellulose fiber in Example 1 was 5% by mass.

Example 2

A cellulose fiber of Example 2 was produced in a manner similar to Example 1 except for the content of the needle-shaped phase in the cellulose fiber being 20% by mass.

Comparative Example 1

A cellulose fiber of Comparative Example 1 was produced in a manner similar to Example 1 except for the needle-shaped phase being not contained (i.e., the content of the needle-shaped phase being set to be 0% by mass).

Evaluation of Tensile Modulus of Elasticity

Tensile modulus of elasticity (G Pa) was determined according to JIS-R-7606 (2000) in Examples and Comparative Example described above. The results are shown in Table 1 and FIG. 4.

TABLE 1

|  | Example 1 | Example 2 | Comparative Example 1 |
|---|---|---|---|
| Content of needle-shaped phase (% by mass) | 5 | 20 | 0 |
| Tensile modulus of elasticity (GPa) | 26.1 | 20 | 12.6 |

Figure 4:
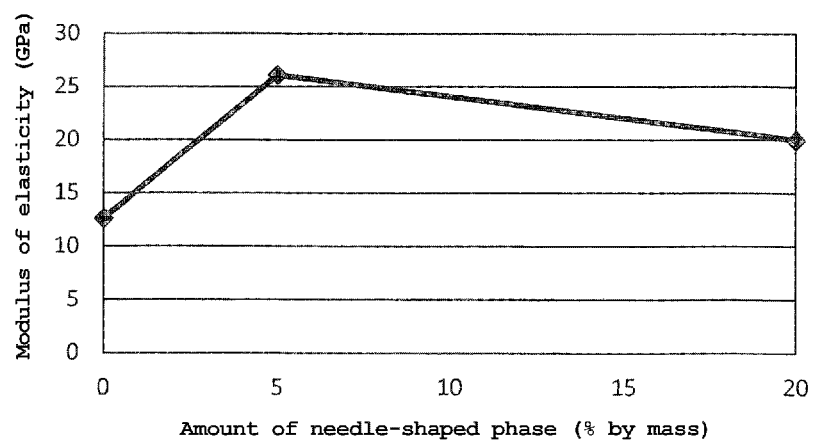
FIG. 4 is a graph showing the relationship between the content of a needle-shaped phase and the tensile modulus of elasticity.

As shown in Table 1 and FIG. 4, it is found that the cellulose fiber of Example 1 possessed a superior tensile modulus of elasticity of 26.1 GPa. Furthermore, it is found that the cellulose fiber of Example 2 also possessed excellent tensile modulus of elasticity of 20 GPa. On the other hand, it is also found that the tensile modulus of elasticity of the cellulose fiber of Comparative Example 1 possessed 12.6 GPa and thus the tensile modulus of elasticity was degraded as compared with that of the cellulose fiber having the matrix phase and the needle-shaped phases.

Example 3

Upon spinning a mixed solution similar to Example 1 using the spinning apparatus 11 of FIG. 2, the speed of winding of the fiber coagulated in the coagulation bath 13 was set to be greater than the speed of discharging of the spinning nozzle 12. As a result, a cellulose fiber having the stretching ratio of 6.5 was produced.

Examples 4 and 5

Cellulose fibers of Examples 4 and 5 were produced in a manner similar to Example 3 except for the stretching ratio being as shown in Table 2.

Evaluation of Tensile Modulus of Elasticity

Figure 5:
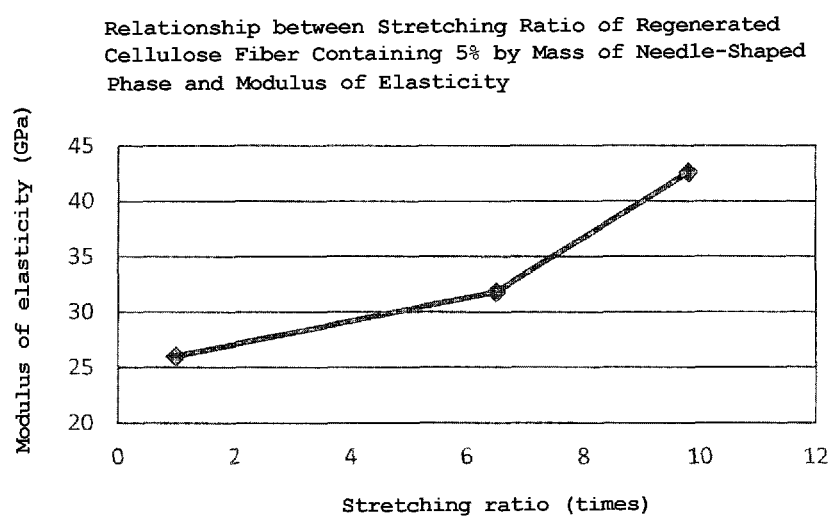
FIG. 5 is a graph showing the relationship between a stretching ratio and the tensile modulus of elasticity.

The results of the tensile modulus of elasticity in Examples are shown in Table 2 and FIG. 5. The tensile modulus of elasticity was determined according to JIS-R-7606 (2000).

TABLE 2

|  | Example 3 | Example 4 | Example 5 |
|---|---|---|---|
| Stretching ratio | 6.5 | 9.8 | <1 |
| Tensile modulus of elasticity (GPa) | 31.8 | 42.6 | 26.0 |

As shown in Table 2 and FIG. 5, it is found that the cellulose fiber of Example 3 possessed the tensile modulus of elasticity of 31.8 GPa and the tensile modulus of elasticity was improved due to stretching. Furthermore, in view of Examples 4 and 5, it is found that the tensile modulus of elasticity was improved as the stretching ratio was greater and that the tensile modulus of elasticity was reduced when the stretching ratio was set to be smaller than 1.

According to the composite material, since the cellulose fiber having a superior modulus of elasticity is provided at least on one face, the strength of the composite material can be easily and reliably improved.

Since the method for producing the cellulose fiber includes the step of preparing the solution in which the matrix phase having the cellulose II crystal structure and the needle-shaped phases each having the cellulose I crystal structure are dispersed, and the step of extruding this solution through the spinning nozzle and coagulating the cellulose fiber, the needle-shaped phases can be easily and precisely oriented along the axial direction in the produced cellulose fiber. Therefore, the method for producing the cellulose fiber exerts not only effects that the affinity of the matrix phase and the needle-shaped phases is high, the needle-shaped phases are readily dispersed uniformly in the matrix phase, and the straightness of the needle-shaped phase is high, but also an effect that the modulus of elasticity of the cellulose fiber can be enhanced easily and reliably. Moreover, according to the method for producing the cellulose fiber, since both the matrix phase and the needle-shaped phase are formed of cellulose, environmental burden can be reduced.

It should be noted that, in the present invention, "average length" and "average diameter" are each calculated by averaging measured values obtained on forty randomly collected fibers using a scanning electron microscope (SEM). In addition, "diameter" means a fiber diameter in a case of the conversion into a perfect circle.

As explained in the foregoing, according to the cellulose fiber and the composite material containing the cellulose fiber according to the aspects of the present invention, the modulus of elasticity can be enhanced easily and reliably, and environmental burden can be reduced. Furthermore, according to the method for producing the cellulose fiber according to still another aspect of the present invention, the cellulose fiber having an enhanced modulus of elasticity and contributing to reduction of the environmental burden can be produced easily and reliably.

As explained in the foregoing, according to the cellulose fiber of the embodiment of the present invention, the modulus of elasticity of the cellulose fiber of the present invention can be enhanced easily and reliably, and environmental burden can be reduced. Therefore, the cellulose fiber is preferably used as a reinforcement material for a base material and a synthetic resin sheet, for example. The composite material according to the embodiment of the present invention has an effectively improved strength and is preferably used as a sound reflecting board, etc., having an adjusted specific frequency of vibration. Furthermore, the method of producing the cellulose fiber according to the embodiment of the present invention can produce the cellulose fiber according to the embodiment of the present invention easily and reliably.

Given the present disclosure, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

The following references numbers appear in the drawings:

1 matrix phase;
2 needle-shaped phase;
11 spinning apparatus;
12 spinning nozzle;
13 coagulation bath;
14, 15, 16, 17 guide roll;
21 base material;
22 cellulose fiber;
23 binder.

What is claimed is:

1. A cellulose fiber comprising:
a matrix phase; and
needle-shaped phases comprised in the matrix phase,
wherein the matrix phase comprises a cellulose II crystal structure,
wherein the needle-shaped phases comprise a cellulose I crystal structure, and
wherein the needle-shaped phases are oriented along an axial direction.

2. The cellulose fiber according to claim 1, wherein:
an average length of the needle-shaped phases is no less than 2 µm and no greater than 4 µm, and
an average diameter of the needle-shaped phases is no less than 3 nm and no greater than 100 nm.

3. The cellulose fiber according to claim 1, wherein a content of the needle-shaped phases with respect to 100 parts by mass of the matrix phase in terms of solid content is no less than 2 parts by mass and no greater than 25 parts by mass.

4. A composite material comprising:
a base material;
a cellulose fiber provided at least on one face of the base material; and
a binder that secures the cellulose fiber to the base material,
wherein the cellulose fiber comprises:
a matrix phase; and
needle-shaped phases comprised in the matrix phase,
wherein the matrix phase comprises a cellulose II crystal structure,
wherein the needle-shaped phases comprise a cellulose I crystal structure, and
wherein the needle-shaped phases are oriented along an axial direction.

5. A method of producing a cellulose fiber comprising the steps of:
preparing a solution where needle-shaped phases each comprising a cellulose I crystal structure are dispersed in a matrix phase comprising a cellulose II crystal structure; and
extruding the solution through a spinning nozzle and coagulating the cellulose fiber.

* * * * *